United States Patent Office 3,398,067

Patented Aug. 20, 1968

3,398,067

METHOD OF MAKING THIN FILM CAPACITOR

Aubrey J. Raffalovich, Little Silver, N.J., assignor to the United States of America as represented by the Secretary of the Army No Drawing. Filed Nov. 3, 1964, Ser. No. 408,704
3 Claims. (Cl. 204—37)

ABSTRACT OF THE DISCLOSURE

A thin film capacitor is obtained by depositing an anodizable metal onto a substrate. The deposited layer is then anodized in a suitable electrolyte to form an oxide film, the oxide or anodized film aged, and the aged oxide film then reanodized.

The invention described herein may be manufactured and used by or for the Government for governmental purposes without the payment of any royalty thereon.

This invention relates to a method of making a thin film capacitor.

It has been known to make thin film capacitors by first sputtering a thin layer of an anodizable metal onto a substrate such as glass, alumina, quartz, treated semiconductive single crystal wafers, etc. The deposited metal is then anodized in a suitable electrolyte at a predetermined constant current until a predetermined voltage is reached. This voltage is then held until the current drops to a constant amperage. Then, an electrically conductive metal such as gold or aluminum is deposited in a predetermined area or areas upon the oxide layer formed by the anodization process. The electrically conductive metal deposit serves as the top electrode, and the under layer of the sputtered metal serves as the bottom electrode. Though the foregoing method results in a thin film capacitor having some desirable electrical properties, it still does not have sufficient capacitance for certain applications such as in thin film circuits in miniature equipment and computers and in microminiaturized equipment.

An object of this invention is to provide a simple method of making a thin film capacitor. Another object of the invention is to provide a simple method of making a thin film capacitor that will have an improved capacitance over thin film capacitors made by the foregoing method. A further object of the invention is to provide a simple method of making a thin film capacitor that will be suitable for use in miniature equipment, computers, microminiaturized equipment and the like.

It has now been found that the foregoing objectives can be obtained by the following simple method. According to the method, a thin layer of an anodizable metal is first deposited onto a substrate such as glass, alumina, or quartz, treated semiconductive single crystal wafers and the like. The deposited layer is then anodized in a suitable electrolyte to form an oxide film. The oxide or anodized film is then aged either in air for about 2 to 24 hours, or in the electrolyte itself for about 2 to 24 hours, or in an oven at 80 to 100° C. for about 2 to 24 hours. The aged oxide film is then reanodized using the same conditions as in the original anodization.

The following example is illustrative of a desirable embodiment of the invention.

Example 1

A thin film about 1000 angstroms thick of tantalum metal is deposited onto a glass substrate by sputtering. The tantalum film is then anodized in .5 percent equeous ammonium chloride solution at a current density of 4 milliamperes per square inch until a maximum of 46 volts is reached. The 46 volts is held constant until the current drops to a constant level. The oxide or anodized film is then aged in air for 8 hours at room temperature. The aged tantalum oxide film is then reanodized in the same electrolyte and under the same conditions as the original anodization. Finally, gold is deposited upon the predetermined area or areas of the oxide film.

It is found that the thin film capacitor produced has an average temperature coefficient of a capacitance of 202 parts per million per degree centigrade over the range from —30° C. to 130° C., a dissipation factor of 0.018, a mean value of 1.76 microfarads per square inch, a dielectric constant of 21.6 and a voltage breakdown over 200 percent of the formation voltage. When a thin film capacitor is prepared in the same manner as above except without ageing and reanodization, the thin film capacitor produced has an average temperature coefficient of capacitance of 259 parts per million per degree centigrade over the range from —30° to 130° C., a dissipation factor of 0.020, a mean value of 1.60 microfarads per square inch, a dielectric constant of 19.6 and a voltage breakdown between 90 and 100 percent of the formation voltage. Furthermore, the reanodized thin film capacitor shows a 10 fold improvement over the anodized thin film capacitor in insulation resistance and current leakage.

According to the invention, the deposition of the anodizable metal onto the substrate can be accomplished by sputtering, by evaporating under vacuum, or by any other conventional deposition techniques. The anodizable metal deposited onto the substrate may be tantalum, aluminum, niobium, titanium, tungsten, or zirconium. The amount of anodizable metal deposited may be between about 100 angstroms and 5000 angstroms in thickness.

Suitable electrolytes for use in the anodizing process include any of the conventional solutions used in anodizing techniques such as citric acid, sulfuric acid, phosphoric acid, ammonium borate, etc.

The thickness of the anodized film or layer is generally from 50 to 4000 angstroms.

The electrically conductive metal deposited upon the predetermined areas of the oxide film may be gold, aluminum, or any easily evaporated low resistance metal. The reanodization step is carried out under the same conditions as the initial anodization. The amount of electrically conductive metal deposited is usually about 600 angstroms in thickness. The electrically conductive metal serves as the top electrode of the thin film capacitor, and the under layer of the sputtered metal serves as the bottom electrode of the thin film capacitor.

The foregoing description is to be considered merely as illustrative of the invention and not in limitation thereof.

What is claimed is:

1. The method of making a thin film capacitor including the steps of (1) depositing a layer of 100 to 5000 angstroms thick of tantalum onto a glass substrate, (2) anodizing the deposited layer in a 5 percent aqueous ammonium chloride solution at a current density of about 4 milliamperes per square inch until a predetermined voltage is obtained, (3) ageing the deposited layer in air for 8 hours at room temperature, (4) reanodizing the deposited layer under the same conditions as in the original anodization, and (5) depositing an electrically conductive metal upon the predetermined areas of the anodized film.

2. The method according to claim 1 wherein the electrically conductive metal is gold.

3. The method according to claim 1 wherein the electrically conductive metal is aluminum.

References Cited

UNITED STATES PATENTS

| | | | |
|---|---|---|---|
| 1,935,860 | 11/1933 | Robinson | 204—37 XR |
| 2,785,116 | 3/1957 | Bolten et al. | 204—56 XR |
| 2,874,448 | 2/1959 | Haldeman | 29—576 |
| 3,159,556 | 12/1964 | McLean et al. | 204—38 XR |

HOWARD S. WILLIAMS, *Primary Examiner.*

W. VAN SISE, *Assistant Examiner.*